April 11, 1950     J. G. FONTAINE     2,503,580
WHEEL ALIGNMENT GAUGE
Filed May 10, 1948

INVENTOR
JOHN GARFIELD FONTAINE
ATTORNEY

Patented Apr. 11, 1950

2,503,580

UNITED STATES PATENT OFFICE 2,503,580

WHEEL ALIGNMENT GAUGE

John Garfield Fontaine, Vancouver,
British Columbia, Canada

Application May 10, 1948, Serial No. 26,230

2 Claims. (Cl. 33—203)

My invention relates to improvements in wheel alignment gauges for cars and trucks.

The objects of the invention are to provide a gauge of simple construction which can be conveniently handled in adjusting for position under a wheel, and also to provide a gauge wherein the scale reading is not affected by any transverse movement of the wheel receiving plate, so that the extent of disalignment of a wheel can be determined with extreme accuracy.

Referring to the drawings—

In the drawings like characters of reference indicate corresponding parts in each figure.

Figure 1:
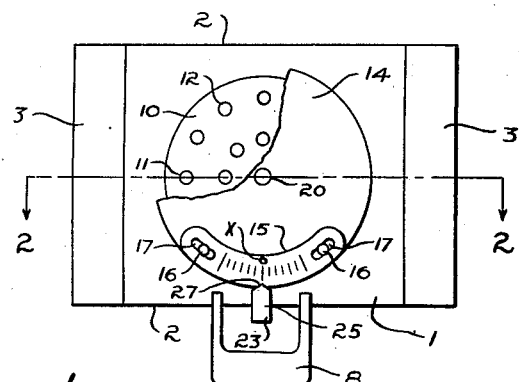
Figure 1 is a plan view of the invention.
Figure 2:
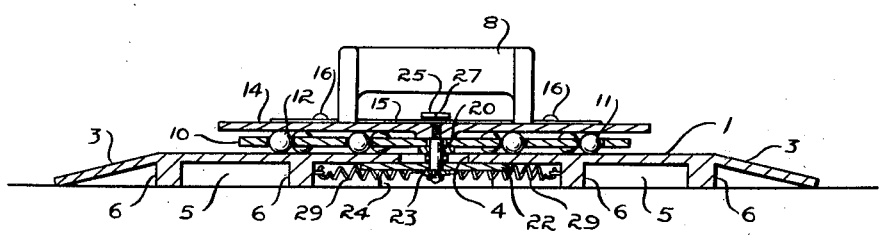
Figure 2 is an enlarged longitudinal sectional view taken on the line 2—2 of Figure 1.
Figure 3:
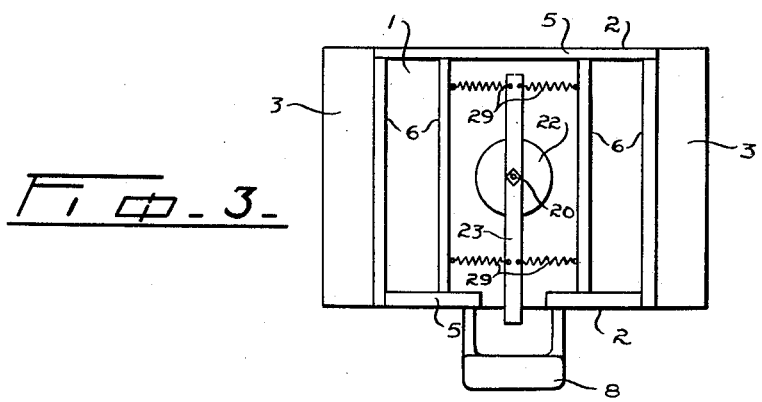
Figure 3 is a plan view of the underside of the invention.

The numeral 1 indicates generally a rectangular base plate having side edges 2 and inclined ramps 3. The base plate 1 is provided with a central opening 4 and depending ribs 5 and 6, the underside of which lie in the same plane as the lower edges of the ramps 3. A handle 8 is fitted to one of the side edges 2 for convenience in adjusting the position of the device under a wheel.

Spaced above the base plate 1 is a ball retainer 10 provided with rows of apertures 11 in which a plurality of ball bearings 12 are freely rotatable. Rotatably supported upon the bearings 12 is a circular wheel receiving plate 14 having a graduated scale 15 adjustably held upon its rim by screws 16 which extend through arcuate slots 17 formed at the extremities of said scale. The plate 14 is provided with a centrally disposed bolt 20 which extends downwardly through the disc 10 and the opening 4 of the base plate 1 and is fitted with a disc 22 of substantially greater diameter than the base opening 4 to permit the plate 14 to move laterally in any direction about the base plate 1. The bolt 20 is freely rotatable within the disc 22 so that the wheel receiving plate 14 and the ball retainer 10 may rotate freely above the base plate 1.

A transverse arm 23 is secured to the underside of the disc 10 extending through a gap 24 defined between the inner ends of one of the side border ribs 5. This arm is upwardly and inwardly bent to fold over an edge of the base plate 1 and the edge of the wheel receiving plate 14, as at 25, and is pointed at its free end to form an index 27 by which to read the graduations on the scale 15.

The ribs 6 are equidistantly spaced from the centre of the opening 4 and are parallel to each other, and from each of said ribs and widely spaced apart are four longitudinally disposed coil springs 29, each having the same tension, two of these springs are secured near one end of the arm 23 and two are secured near the opposite end of said arm and all are anchored at their outer ends to the ribs 6, so as to normally hold the bolt 20 and the wheel receiving plate 14 centred with respect to the base plate 1.

In use, the device is approximately centred under a jacked up wheel which is to be aligned, the wheel is lowered onto the wheel receiving plate 14 and if the zero mark X on the scale 15 is not in register with the overhanging index 27, said scale is moved circumferentially of the receiving plate to correct the said register. The wheel is then swung to a position parallel to the longitudinal axis of the chassis, which causes the receiving plate 14 to turn an equal distance and carry the scale 15 relative to the index 27, so that the extent of disalignment of the wheel from said chassis axis may be accurately read. If the wheel being gauged is out of proper camber, it will cause the receiving plate 14 to move laterally relative to the base plate 1, when said wheel is swung from the steering column, but since the index 27 moves coincidentally with any lateral movement of the said wheel receiving plate, very little or no error will occur in the registration between the scale 15 and the index 27.

What I claim as my invention is:

1. A wheel alignment gauge comprising a base plate having a central opening, a vertical bolt mounted for lateral movement within said opening, a wheel receiving plate rotatable with the bolt, a transverse arm mounted upon the lower end of the bolt to move laterally in any direction therewith, said wheel receiving plate having a graduated scale and said arm having an index registering with said scale, a pair of normally aligned springs secured adjacent each end of the arm equidistantly from the bolt and anchored below the base plate, all of said springs being of equal tensional value, and being normally disposed parallel to each other.

2. A wheel alignment gauge comprising a base plate having a central opening and an inclined ramp at each end, a pair of parallel base plate supporting ribs extending across the underside of the plate parallel to the ramps and adjacent the opening, a vertical bolt mounted for lateral movement in any direction within the opening, a ball retainer upon the base plate, a wheel receiving plate secured to the plate having rotational movement upon the ball retainer, a transverse bar disposed between the ribs and in which the bolt is journalled, a pair of tension springs connected adjacent each end of the bar and spaced from the bolt, said springs being of equal tensional value and being anchored to the ribs of the base plate, said wheel receiving plate having a graduated scale and said arm having an index pointing to said scale.

JOHN GARFIELD FONTAINE.

REFERENCES CITED

The following references are of record in the file of this patent:

UNITED STATES PATENTS

| Number | Name | Date |
|---|---|---|
| 1,874,271 | Fracker | Aug. 30, 1932 |
| 1,878,664 | Bennett | Sept. 20, 1932 |
| 2,125,534 | Wochner | Aug. 2, 1938 |
| 2,250,742 | Bennett | July 29, 1941 |